United States Patent
Linzer

(10) Patent No.: US 9,131,233 B1
(45) Date of Patent: *Sep. 8, 2015

(54) METHODS FOR INTRA BEATING REDUCTION IN VIDEO COMPRESSION

(75) Inventor: Elliot N. Linzer, Suffern, NY (US)

(73) Assignee: Ambarella, Inc., Santa Clara, CA (US)

( * ) Notice: Subject to any disclaimer, the term of this patent is extended or adjusted under 35 U.S.C. 154(b) by 844 days.

This patent is subject to a terminal disclaimer.

(21) Appl. No.: 12/893,205

(22) Filed: Sep. 29, 2010

Related U.S. Application Data

(63) Continuation of application No. 11/235,906, filed on Sep. 27, 2005, now Pat. No. 7,809,057.

(51) Int. Cl.
| | |
|---|---|
| *H04N 19/114* | (2014.01) |
| *H04N 19/159* | (2014.01) |
| *H04N 19/172* | (2014.01) |
| *H04N 19/105* | (2014.01) |
| *H04N 19/176* | (2014.01) |
| *H04N 19/61* | (2014.01) |
| *H04N 19/124* | (2014.01) |

(52) U.S. Cl.
CPC ........... *H04N 19/114* (2013.01); *H04N 19/159* (2013.01); *H04N 19/105* (2013.01); *H04N 19/124* (2013.01); *H04N 19/172* (2013.01); *H04N 19/176* (2013.01); *H04N 19/61* (2013.01)

(58) Field of Classification Search
CPC ................... H04N 19/00727; H04N 19/00163; H04N 19/002; H04N 19/00284; H04N 19/0026; H04N 19/00781; H04N 19/0009; H04N 19/00648; H04N 19/105; H04N 19/159; H04N 19/176; H04N 19/172; H04N 19/61; H04N 19/114; H04N 19/124
See application file for complete search history.

(56) References Cited

U.S. PATENT DOCUMENTS 5,231,484 A * 7/1993 Gonzales et al. ........ 375/240.04
6,154,603 A * 11/2000 Willis et al. ................... 386/351

(Continued)

OTHER PUBLICATIONS

Heath et al. "Segmentation of MPEG-2 motion imagery within the compressed domain" Hybrid Image and Signal Processing VIII, David P. Casasent, Andrew G. Tescher, Editors, Proceedings of SPIE vol. 4735 (2002).*

Puri et al., "Motion-Compensation Video Coding With Adaptive Perceptual Quantization", IEEE-CSVT, 1991, pp. 351-361.

(Continued)

*Primary Examiner* — Behrooz Senfi
*Assistant Examiner* — Mohammed Jebari
(74) *Attorney, Agent, or Firm* — Christopher P. Maiorana, PC

(57) ABSTRACT

A method for compressing a video stream including the steps of: (1) encoding at least two pictures of the video stream as a first intra picture and a second intra picture, where the first intra picture occurs temporally before the second intra picture, (2) encoding another picture of the video stream as a first inter picture, where the first inter picture (a) occurs temporally (i) after the first intra picture and (ii) before the second intra picture and (b) uses (i) the second intra picture and (ii) one other picture occurring temporally before the first inter picture as references, (3) encoding another picture of the video stream as a second inter picture, where the second inter picture (a) occurs temporally (i) after the first intra picture and (ii) before the second intra picture and (b) uses (i) the second intra picture and (ii) the first inter picture as references and (4) encoding another picture in the video stream as a third inter picture, where the third inter picture (a) occurs temporally after the first intra picture and (ii) before the second intra picture and (b) uses (i) the second intra picture and (ii) the second inter picture as references.

16 Claims, 9 Drawing Sheets

(56) References Cited

U.S. PATENT DOCUMENTS

| | | | |
|---|---|---|---|
| 7,653,128 B2* | 1/2010 | Shibata et al. | 375/240.01 |
| 2002/0176507 A1* | 11/2002 | Ju | 375/240.25 |
| 2004/0017951 A1 | 1/2004 | Koto et al. | 382/239 |
| 2004/0125816 A1* | 7/2004 | Xu et al. | 370/411 |
| 2004/0179032 A1* | 9/2004 | Huang | 345/723 |
| 2005/0257239 A1* | 11/2005 | Evans et al. | 725/88 |
| 2005/0281329 A1* | 12/2005 | Chin | 375/240.01 |
| 2007/0199011 A1* | 8/2007 | Zhang et al. | 725/1 |
| 2007/0247549 A1* | 10/2007 | Jeong et al. | 348/471 |

OTHER PUBLICATIONS

Schwarz et al., "Technical Description of the HH1 Proposal for SVC CE1", International Organisation for Standardisation Organisation Internationale De Normalisation ISO/IED JTCI/SC29/WG11 Coding of Moving Pictures and Audio, Oct. 2004, 26 pages.

Schwarz et al., "Technical Description of the HH1 Proposal for SVC CE2", International Organisation for Standardisation Organisation Internationale De Normalisation ISO/IED JTC1/SC29/WG11 Coding of Moving Pictures and Audio, Oct. 2004, 9 pages.

* cited by examiner

FIG. 2

PICTURES IN ENCODE (BIT STREAM) ORDER

| Type  | I | I | P | B  | B | P | B | B | P | B  | B  | P  | B  | B  | I  | P  | B  | B  | P  | B  | B  | P  | B  | B  | P  | B  | B  | P  | B  | B  | B  |
|-------|---|---|---|----|---|---|---|---|---|----|----|----|----|----|----|----|----|----|----|----|----|----|----|----|----|----|----|----|----|----|----|
| Frame | 0 | 15| 3 | 1  | 2 | 6 | 4 | 5 | 9 | 7  | 8  | 12 | 10 | 11 | 13 | 14 | 30 | 18 | 16 | 17 | 21 | 19 | 20 | 24 | 22 | 23 | 27 | 25 | 26 | 28 | 29 |

PICTURES IN CAPTURE (DISPLAY) ORDER

| Type  | I | B | B | P | B | B | P | B | B | P | B  | B  | P  | B  | B  | I  | B  | B  | P  | B  | B  | P  | B  | B  | P  | B  | B  | P  | B  | B  | I  |
|-------|---|---|---|---|---|---|---|---|---|---|----|----|----|----|----|----|----|----|----|----|----|----|----|----|----|----|----|----|----|----|----|
| Frame | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |

|60|

PREDICTION EXAMPLES (CURRENT PICTURE IN BOX)

| I  |    |    | P  |    | I  |
|----|----|----|----|----|----|
| 0  |    |    | 3  |    | 15 |

| I  |    |    | P  | P  | I  |
|----|----|----|----|----|----|
|    |    |    | 3  | 6  | 15 |

| I  | B  |    | P  | P  |    |
|----|----|----|----|----|----|
| 0  | 1  |    | 3  | 6  |    |

|    | B  | P  | P  |
|----|----|----|----|
|    | 2  | 3  | 6  |

| I  |    |    | B  | P  | P  |
|----|----|----|----|----|----|
| 0  |    |    | 4  | 3  | 6  |

|    |    | B  | P  | P  |
|----|----|----|----|----|
|    |    | 5  | 3  | 6  |

METHODS FOR INTRA BEATING REDUCTION IN VIDEO COMPRESSION

This is a continuation of U.S. Ser. No. 11/235,906, filed Sep. 27, 2005, now U.S. Pat. No. 7,809,057, which is incorporated by reference.

FIELD OF THE INVENTION

The present invention relates to video processing generally and, more particularly, a method and/or architecture for intra beating reduction in video compression.

BACKGROUND OF THE INVENTION

Referring to FIG. 1, a conventional group-of-pictures (GOP) structure 10 is shown. The GOP structure 10 is illustrated in capture order and encode (or transmission) order. The GOP 10 includes I pictures (or frames), P pictures (or frames) and B pictures (or frames). The I-frames (i.e., pictures 0, 15 and 30) are intra coded reference pictures. The P-frames (i.e., pictures 3, 6, 9, 12, etc.) and the B-frames (i.e., pictures 1, 2, 4, 5, etc.) are inter coded pictures. Conventional P-frames are predicted from previous (in time) I or P pictures. For example, pictures P3, P6 and P9 are predicted from pictures I0, P3 and P6, respectively. Conventional B-frames are predicted from previous and future (or subsequent in time) I or P pictures. For example, pictures B1 and B2 are predicted from pictures I0 and P3 and Pictures B4 and B5 are predicted from pictures P3 and P6.

Conventional video compression systems that use inter-frame compression can achieve much higher compression ratios than methods that rely only on intra compression. Examples of inter-frame compression include MPEG-2, MPEG-4 and H.264. In order to provide random access when the inter-frame coding is used, intra coded access points (or I-frames) are periodically placed at a rate of one or two I-frames per second.

One type of artifact introduced by the use of intra coded access points in inter-frame compression is "intra beating". Specifically, the compression artifacts in all or part of a scene can visibly change at each I-frame. A visible beat at the I-frame frequency (typically every one-half to one second) is created. Such artifacts are particularly noticeable in smooth and slow-moving parts of a scene, where no prediction difference is encoded (i.e., the pixels only change at I-frames).

Referring to FIG. 2, a diagram is shown illustrating a hierarchical GOP structure 20. One way to reduce the amount of intra beating is to use a so-called hierarchical GOP structure. When a hierarchical GOP structure with L levels is used, the GOP length is $2^{L-1}$. For example, a 5 layer GOP structure would have a GOP length of 16. When a hierarchical GOP structure with L levels is used, each $2^{L-1}$ picture is a level 0 (L0) picture. Each level 0 picture is coded as an intra (I) picture. For example, pictures 0, 16 and 32 in FIG. 2 are level 0 (I) pictures.

Pictures midway between the L0 (I) pictures are level 1 (L1) pictures. Level 1 pictures are coded as B pictures using the closest previous and future L0 pictures as references (e.g., picture 8 is a B picture that uses pictures 0 and 16 as references, picture 24 is a B picture that uses pictures 16 and 32 as references). Pictures midway between pictures of level 1 or lower are level 2 (L2) pictures. Level 2 pictures are coded as B pictures using the closest previous and future level 1 or lower pictures as references (e.g., picture 4 is a B picture that uses pictures 0 and 8 as references, picture 12 is a B picture that uses pictures 8 and 16 as references, etc.).

Pictures midway between pictures of level 2 or lower are level 3 (L3) pictures. Level 3 pictures are coded as B pictures using the closest previous and future level 2 or lower pictures as references (e.g., picture 2 is a B picture that uses pictures 0 and 4 as references, picture 6 is a B picture that uses pictures 4 and 8 as references, etc.).

The bifurcation of pictures continues until the highest level (i.e., the odd pictures) is reached. In the example in FIG. 2, the highest level is level 4. Level 4 pictures are all the odd pictures. Each level 4 picture is an odd picture which uses the previous and next pictures, which are from level 3 or lower, as references.

Using hierarchical GOP structures can improve quality. However, hierarchical GOP structures have some problems. One problem is the amount of memory needed for decoding hierarchical GOP structures. As the GOP length increases, the number of frames that the decoder must store increases. Specifically, for an L-layer GOP structure, the decoder needs to hold at least L+1 frames at the same time. For example, referring to FIG. 2, when picture 1 is decoded, the decoder must hold at least pictures 0, 16, 8, 4, 2, and 1. H.264 limits the number of pictures that the decoder needs to hold. The exact limit depends on the "level" of the bit stream as well as the picture resolution, but in many important cases (i.e., when the picture resolution is close to the maximum resolution supported by the level) the limit is 4 pictures. For example, a level 4 bit stream can have pictures no bigger than about 1920×1088. When the picture size is 1920×1088, the maximum number of pictures at the decoder is limited to 4. Another problem of the hierarchical GOP structure is that for scenes with complex motion, the level 1 (L1) pictures are so far away from the respective predictors (e.g., L0 (intra) pictures) that the compression and appearance can be degraded.

It would be desirable to implement a video compression system that reduces intra beating.

SUMMARY OF THE INVENTION

The present invention concerns a method for compressing a video stream including the steps of: (1) encoding at least two pictures of the video stream as a first intra picture and a second intra picture, where the first intra picture occurs temporally before the second intra picture, (2) encoding another picture of the video stream as a first inter picture, where the first inter picture (a) occurs temporally (i) after the first intra picture and (ii) before the second intra picture and (b) uses (i) the second intra picture and (ii) one other picture occurring temporally before the first inter picture as references, (3) encoding another picture of the video stream as a second inter picture, where the second inter picture (a) occurs temporally (i) after the first intra picture and (ii) before the second intra picture and (b) uses (i) the second intra picture and (ii) the first inter picture as references and (4) encoding another picture in the video stream as a third inter picture, where the third inter picture (a) occurs temporally after the first intra picture and (ii) before the second intra picture and (b) uses (i) the second intra picture and (ii) the second inter picture as references.

The objects, features and advantages of the present invention include providing an architecture and/or method for video compression that may (i) reduce intra beating, (ii) use a previously occurring intra picture and/or a previously occurring primary inter picture and/or a subsequently occurring intra picture as references; (iii) use adaptive quantization, (iv) generate primary inter pictures using forward and backward prediction, where the primary inter pictures may be used as references and/or (v) generate secondary inter pictures using forward and backward prediction, where the secondary inter pictures are not used as references.

BRIEF DESCRIPTION OF THE DRAWINGS

These and other objects, features and advantages of the present invention will be apparent from the following detailed description and the appended claims and drawings in which:

Figure 2:
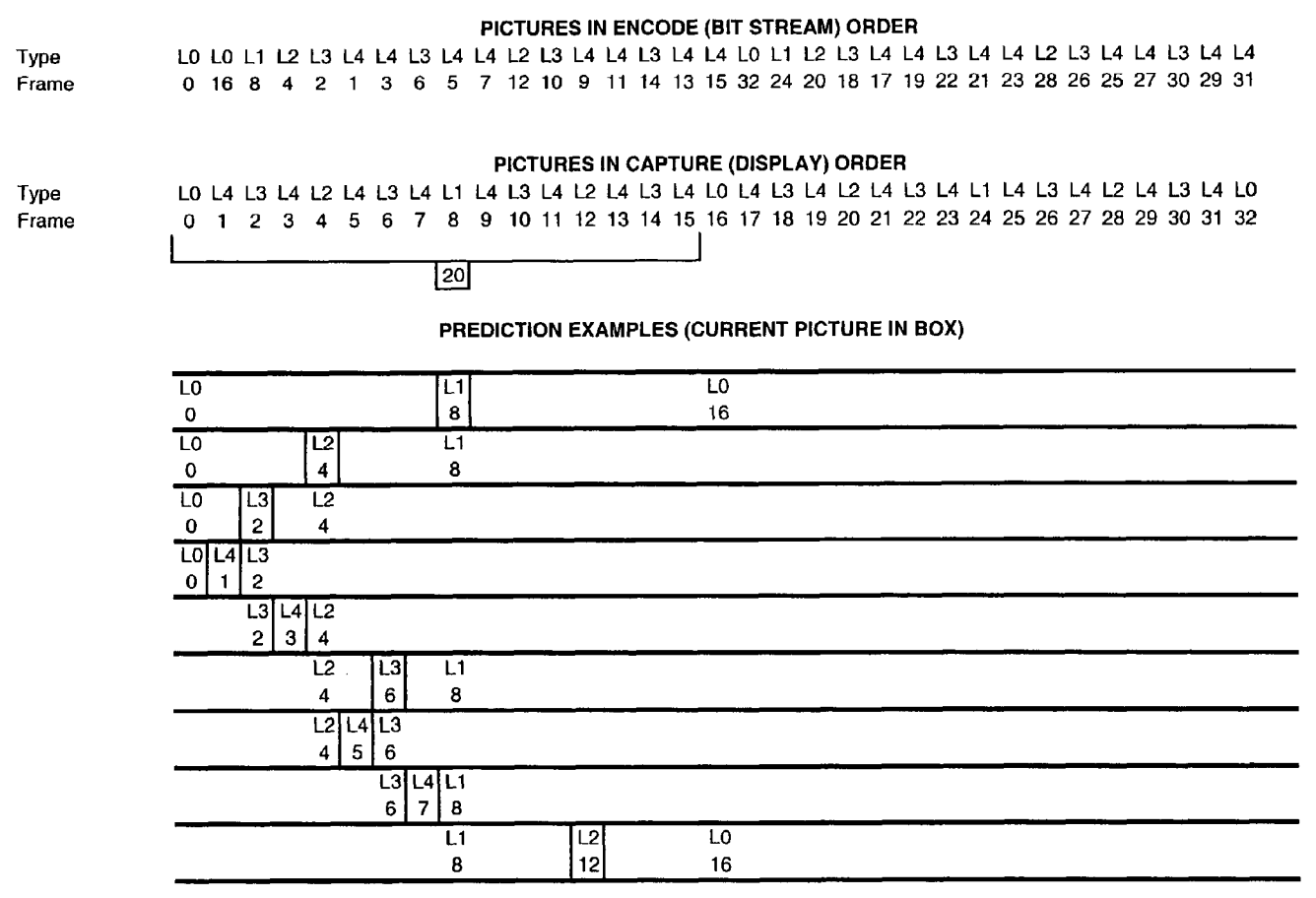

FIG. 2 is a diagram illustrating a hierarchical group of pictures (GOP) structure;

FIG. 4 is a diagram illustrating an example of an encoding scheme in accordance with a preferred embodiment of the present invention;

FIG. 8 is a diagram illustrating an example of an encoding scheme in accordance with another preferred embodiment of the present invention.

DETAILED DESCRIPTION OF THE PREFERRED EMBODIMENTS

The present invention may be used to reduce I-frame beating by using backward (as well as forward) prediction of "P" pictures. The present invention generally does not use the term P picture in the conventional sense, since backward prediction is also used. In contrast to a conventional P picture, a P picture (or primary inter picture) of the present invention is generally predicted with the previous (in time) P or I picture and the future (in time) I picture.

Figure 1:
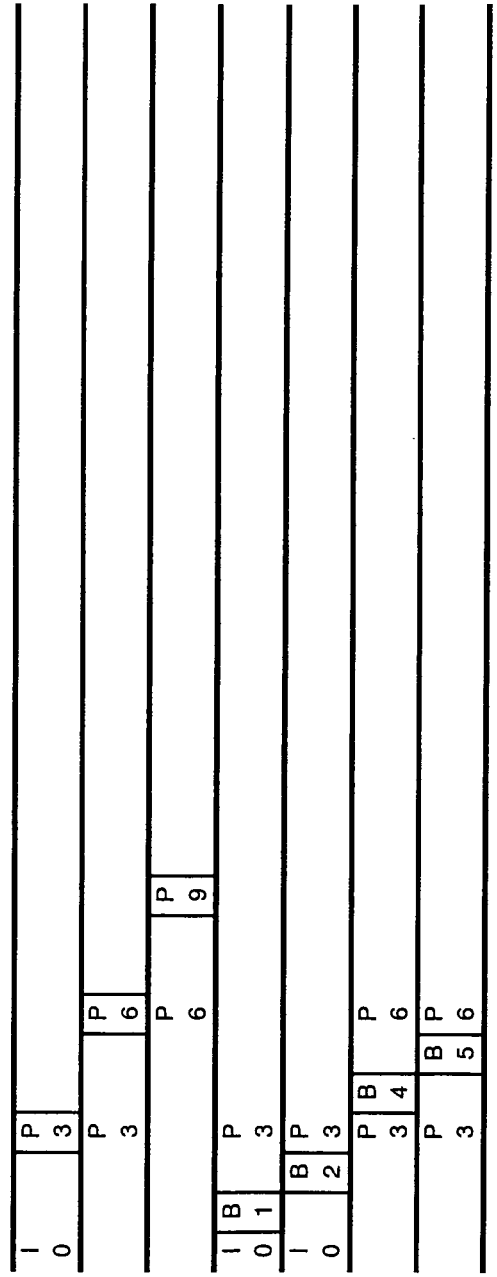
FIG. 1 is a diagram illustrating a conventional group of pictures (GOP) structure.
Figure 3:
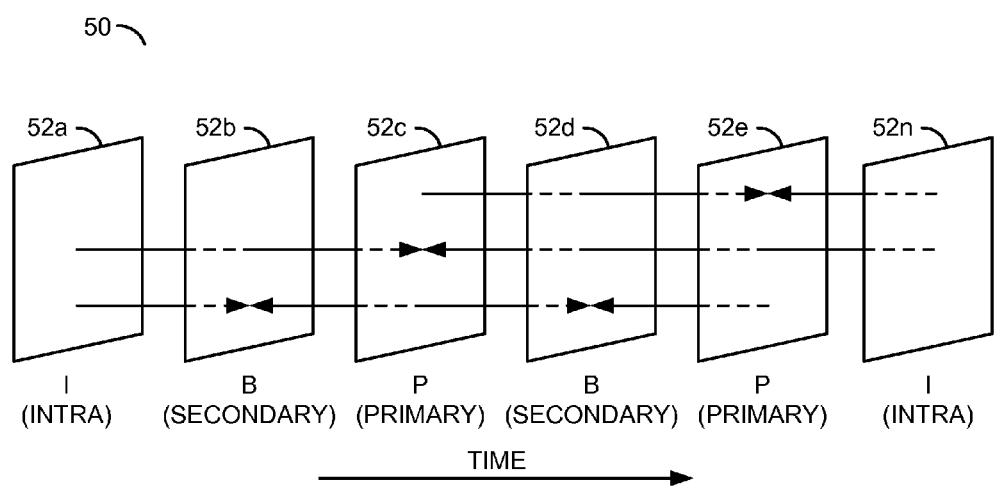
FIG. 3 is a diagram illustrating a group of pictures (GOP) structure in accordance with the present invention.

Referring to FIG. 3 a diagram is shown illustrating a group of pictures (GOP) structure 50 in accordance with a preferred embodiment of the present invention. The GOP 50 generally comprises a number of pictures 52a-52n. The pictures are generally classified according to three picture types: (i) Intra pictures (or I pictures), (ii) primary inter pictures (or P pictures) and (iii) secondary inter pictures (or B pictures). The intra pictures (e.g., pictures 52a and 52n) do not use references. The primary inter pictures (e.g., pictures 52c and 52e) may use as references (i) the next (in temporal order) intra picture, (ii) a previous (in temporal order) primary inter picture or intra picture and/or (iii) other appropriate pictures. The secondary inter pictures (e.g., 52b and 52d) generally use as references (i) previous (in temporal order) primary inter or intra pictures, (ii) future (in temporal order) primary inter or intra pictures and/or (iii) other pictures. Arrows are shown illustrating which pictures are used as references for other pictures.

Referring to FIG. 4, a diagram is shown illustrating an example of a video stream encoding scheme in accordance with a preferred embodiment of the present invention. A video stream may comprise a group of pictures (GOP) 60. The GOP 60 may be encoded with intra coded (I) pictures, primary inter (P) pictures and secondary inter (B) pictures. The primary inter pictures may use P slices or B slices. The secondary inter pictures may also use P slices or B slices. In H.264, a picture may be divided into groups of macroblocks called slices. Each slice has a type: I, P or B. In general, the type of each slice need not be the same within a picture. Both P slices and B slices can use more than one reference frame (or picture). However, in contrast to P slices, B slices may use temporal averaging (bi-) prediction.

In general, the same slice type (e.g., I, P or B) is used throughout the picture, so that the slice used names the picture (e.g., I picture, P picture, B picture, etc.). In H.264, "P slice" and "B slice" can use forward prediction, as well as backward prediction. However, only a B slice can use temporal averaging. In the preferred embodiment of the present invention, when both forwards prediction (e.g., prediction using a reference picture occurring temporally before the predicted picture) and backwards prediction (e.g., prediction using a reference picture occurring temporally after the picture being predicted) are used for a picture, B slice is used in the entire picture.

The primary inter pictures (Pi) may use as references (i) the next (in temporal order) intra picture, (ii) a previous (in temporal order) primary inter picture or intra picture and/or (iii) other appropriate pictures. For example, (i) the primary inter picture P3 may use the intra pictures I0 and I15 as references, (ii) the primary inter picture P6 may use the primary inter picture P3 and the intra picture I15 as references and (iii) the primary inter picture P9 may use the primary inter picture P6 and the intra picture I15 as references. Since the primary inter picture P3 uses the intra picture I0 as a reference, the primary inter pictures P6 and P9 are indirectly referenced to the intra picture I0. Similarly, the secondary inter pictures (e.g., B1, B2, B4 and B5) use the intra pictures I0 and I15, directly or indirectly, as references (e.g., via references to primary inter pictures P3 and P6).

Figure 5:
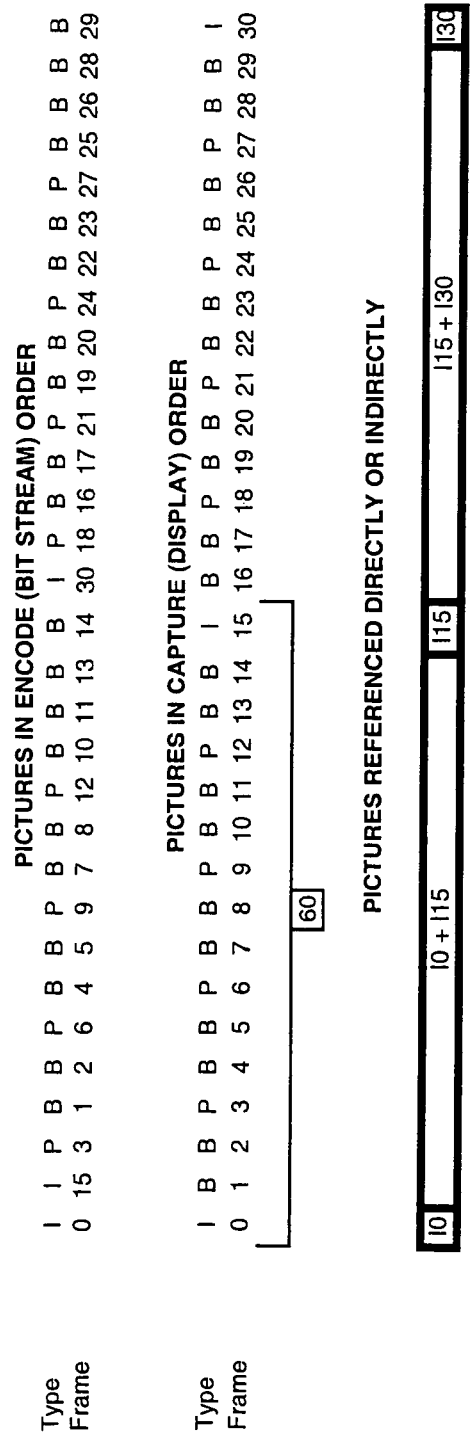
FIG. 5 is a diagram illustrating an example of an encoding scheme using I pictures directly or indirectly as predictions.

Referring to FIG. 5, a diagram is shown illustrating which pictures in the group of pictures (GOP) 60 use which of the I pictures, directly or indirectly, as references. The present invention generally eliminates sharp transitions from one intra picture to another. In general, both I pictures (e.g., I0 and I15) in the GOP 60 are used either directly or indirectly as predictors over the entire set of inter pictures occurring between the two I pictures. The use of two intra pictures as predictors over an entire set of inter pictures occurring between the I pictures is an attribute also shared by hierarchical GOP structures. In both cases, using reference frames that are both forward and backward predicted can "bridge" two I pictures and so reduce intra beating.

Figure 6:
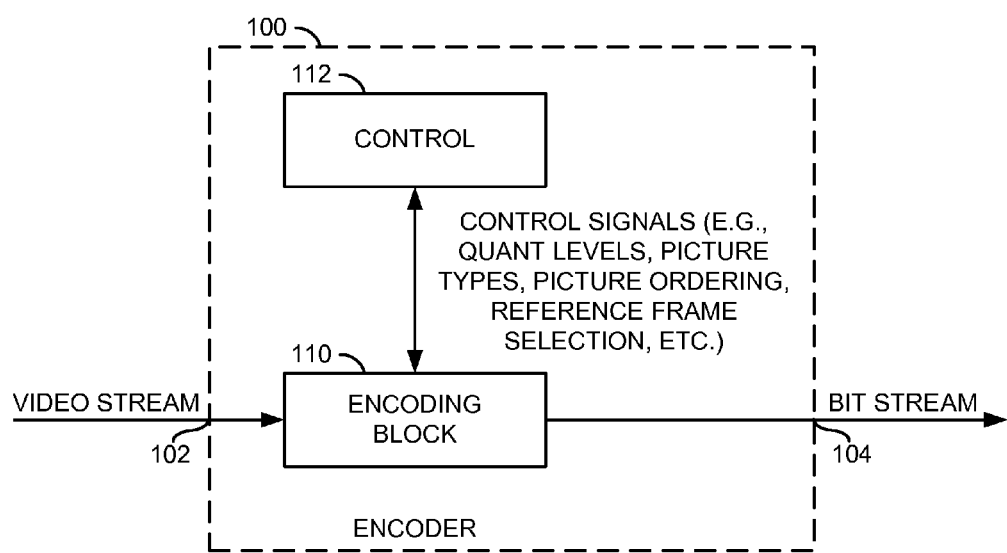
FIG. 6 is a diagram illustrating an encoder in accordance with the present invention.

Referring to FIG. 6, a block diagram is shown illustrating a circuit 100 in accordance with a preferred embodiment of the present invention. In one example, the circuit 100 may be implemented as a video encoder circuit. The circuit 100 may have an input 102 that may receive a signal (e.g., VIDEO STREAM) and an output 104 that may present a signal (e.g., BIT STREAM). The signal VIDEO STREAM may comprise a number of uncompressed frames, fields or pictures. The signal BIT STREAM may comprise a compressed bit stream.

In one example, the circuit 100 may comprise an encoding circuit (or block) 110 and a control circuit (or block) 112. The encoding circuit 110 may be configured to generate the compressed bit stream BIT STREAM in response to the video stream VIDEO STREAM and one or more control signals (e.g., QUANT LEVELS, PICTURE TYPES, PICTURE ORDERING, REFERENCE FRAME SELECTION, etc.). The signal QUANT LEVELS may be configured to control a quantization process of the encoding circuit 110. For example, the signal QUANT LEVELS may adaptively vary the quantization levels used based on macro block contents.

In one example, the signal PICTURE TYPES may be configured to control whether the encoding circuit 110 encodes a particular picture as an intra picture, a primary inter picture, or a secondary inter picture. The signal PICTURE ORDERING may be configured to control the order in which the encoding circuit 110 encodes pictures and/or places encoded pictures into the signal BIT STREAM. The signal REFERENCE FRAME SELECTION may be configured to control how the encoding circuit 110 selects which pictures in a group of pictures are encoded as reference frames.

The control circuit 112 may be configured to generate the one or more control signals (e.g., QUANT LEVELS, PICTURE TYPES, PICTURE ORDERING, REFERENCE FRAME SELECTION) such that intra beating is reduced. In one example, the circuit 112 may be configured to generate the signal QUANT LEVELS using conventional techniques to set the general quantization level. In one example, adaptive quantization may be used to vary from the general level. For example, quantization values may be changed from one macro block to another macro block in order to reduce the visibility of quantization noise.

The circuit 112 may be configured to generate the signals PICTURE TYPES and REFERENCE FRAME SELECTION in accordance with the examples herein presented. For example, skilled artisans would recognize how to implement the circuit 112 based upon the teachings of the present disclosure. The circuit 112 may be further configured to generate the signal PICTURE ORDERING according to the following process. In one example, the circuit 112 may be configured to determine the earliest picture (temporally) that has not been put into the bit stream and that has all references for the picture already in the bit stream. The circuit 112 may control the circuit 110 to put that picture in the bit stream. The process may continue until all pictures of the group of pictures have been placed in the bit stream.

In one example, the control circuit 112 may be configured to encode the signal VIDEO STREAM with a first intra picture, a second intra picture, a first inter picture, a second inter picture and a third inter picture. The first intra picture occurs temporally before the second intra picture. The first inter picture (i) occurs temporally after the first intra picture and before the second intra picture and (ii) uses the second intra picture and one other picture occurring temporally before the first inter picture as references. The second inter picture (i) occurs temporally after the first intra picture and before the second intra picture and (ii) uses the second intra picture and the first inter picture as references. The third inter picture (i) occurs temporally after the first intra picture and before the second intra picture and (ii) uses the second intra picture and the second inter picture as references.

Figure 7:
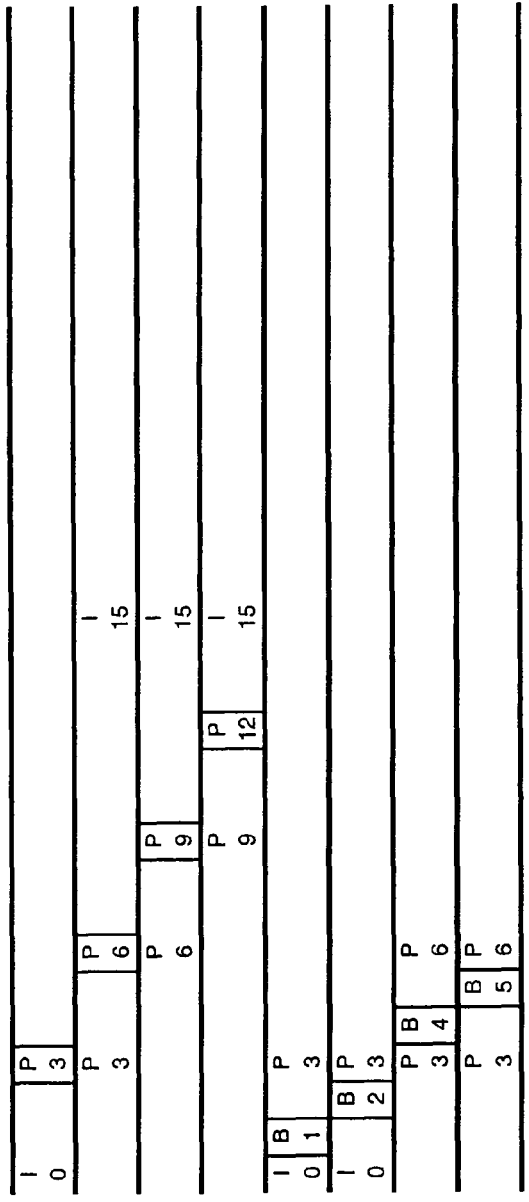
FIG. 7 is a diagram illustrating an example of an encoding scheme in accordance with another preferred embodiment of the present invention.

Referring to FIG. 7, a diagram is shown illustrating an example of an encoding scheme in accordance with another preferred embodiment of the present invention. Memory limitations may be considered when optimizing the techniques of the present invention. When the GOP structure 60 is encoded as K, storage equal to approximately one GOP is utilized at the encoder. For example, when the picture I15 is being encoded, the pictures 1-14 (which have been captured but not yet encoded) are held in memory storage. However, an encoding system may not have enough memory to implement the structure described in FIG. 4. For example, an encoder may be implemented with less memory to reduce cost.

In an encoding system with less memory (or longer GOPs), the present invention may be implemented using backwards prediction of primary inter pictures at the end of the GOP, but not the primary inter pictures at the beginning of the GOP. As the amount of memory that is available in the encoder increases, the number of primary inter pictures that may use backward prediction may increase. In one example (as shown in FIG. 7), less than all of the primary inter pictures (e.g., primary inter pictures 6, 9, 12) may use backwards prediction (e.g., using the subsequent intra picture I15 as a reference). However, the encoder may be implemented with less memory than an encoder implementing both forwards and backwards prediction. For example, when the picture I15 is being encoded the only uncoded pictures that are held in memory are pictures 3-14.

Figure 8:
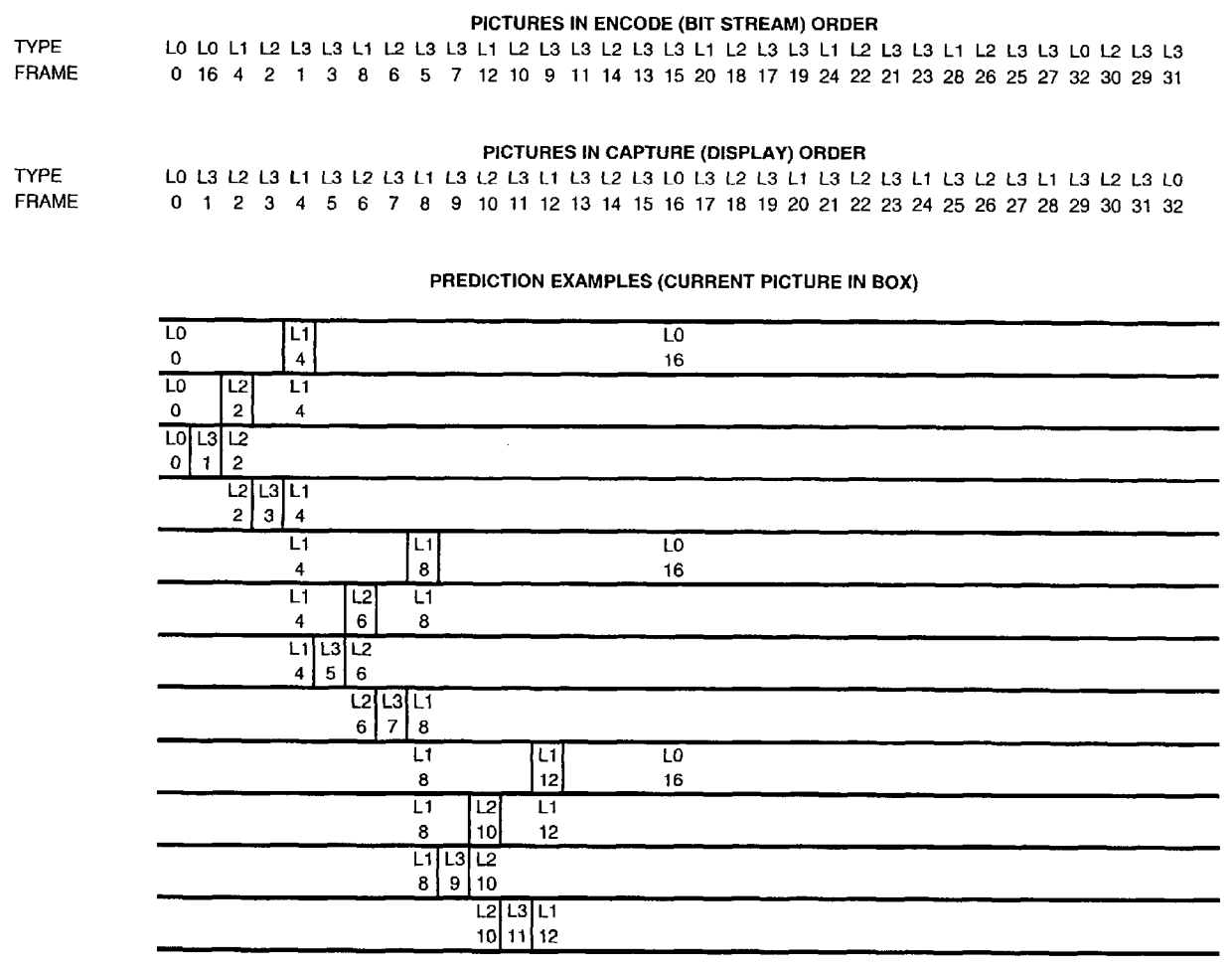

Referring to FIG. 8, a diagram is shown illustrating an example of an encoding scheme in accordance with yet another preferred embodiment of the present invention. In one example, the encoding scheme of the present invention may be implemented as a combined periodic backwards predicted primary inter pictures plus hierarchical GOP structure scheme. The combined periodic backward predicted primary inter pictures plus hierarchical GOP structure scheme may provide an advantage by reducing the number of levels corresponding to a given GOP length. For example, in the example of FIG. 8, four levels are implemented while having a GOP of length 32. In the example shown in FIG. 8, every fourth picture is a level 1 picture that is encoded not from the previous and next intra coded picture, but from the previous intra or P picture and the next intra coded picture.

For example, in a first step, picture 4 may be predicted using pictures 0 and 16 as references. In a second step, picture 2 may be predicted using pictures 0 and 4 as references. In a third step, picture 1 may be predicted using pictures 0 and 2 as references. In a fourth step, picture 3 may be predicted using pictures 2 and 4 as references. In a fifth step, picture 8 may be predicted using pictures 4 and 16 as references. In a sixth step, picture 6 may be predicted using pictures 4 and 8 as references. In a seventh step, picture 5 may be predicted using pictures 4 and 6 as references. The pattern of references used for predicting pictures may be repeated for the remaining pictures in the GOP.

In addition to the encoding schemes described above, the present invention may increase the reduction in intra beating by also implementing adaptive quantization. Adaptive quantization as used herein generally refers to changing the quantization values from one macroblock to another macroblock in order to reduce the visibility of quantization noise. Specifically, a finer quantization may be used on macroblocks where quantization noise would be more visible. The MPEG-2 test model 5 encoder uses adaptive quantization. Since intra beating is more visible on smoother blocks, using adaptive quantization is a further method, that, in conjunction with other methods described herein, may reduce intra beating. In general, using adaptive quantization and any method of eliminating sharp transitions at I pictures is generally very effective at removing intra beating. Combining adaptive quantization with schemes that use B pictures as references (e.g., as shown in FIGS. 4 and 7) may reduce intra beating.

Figure 9:
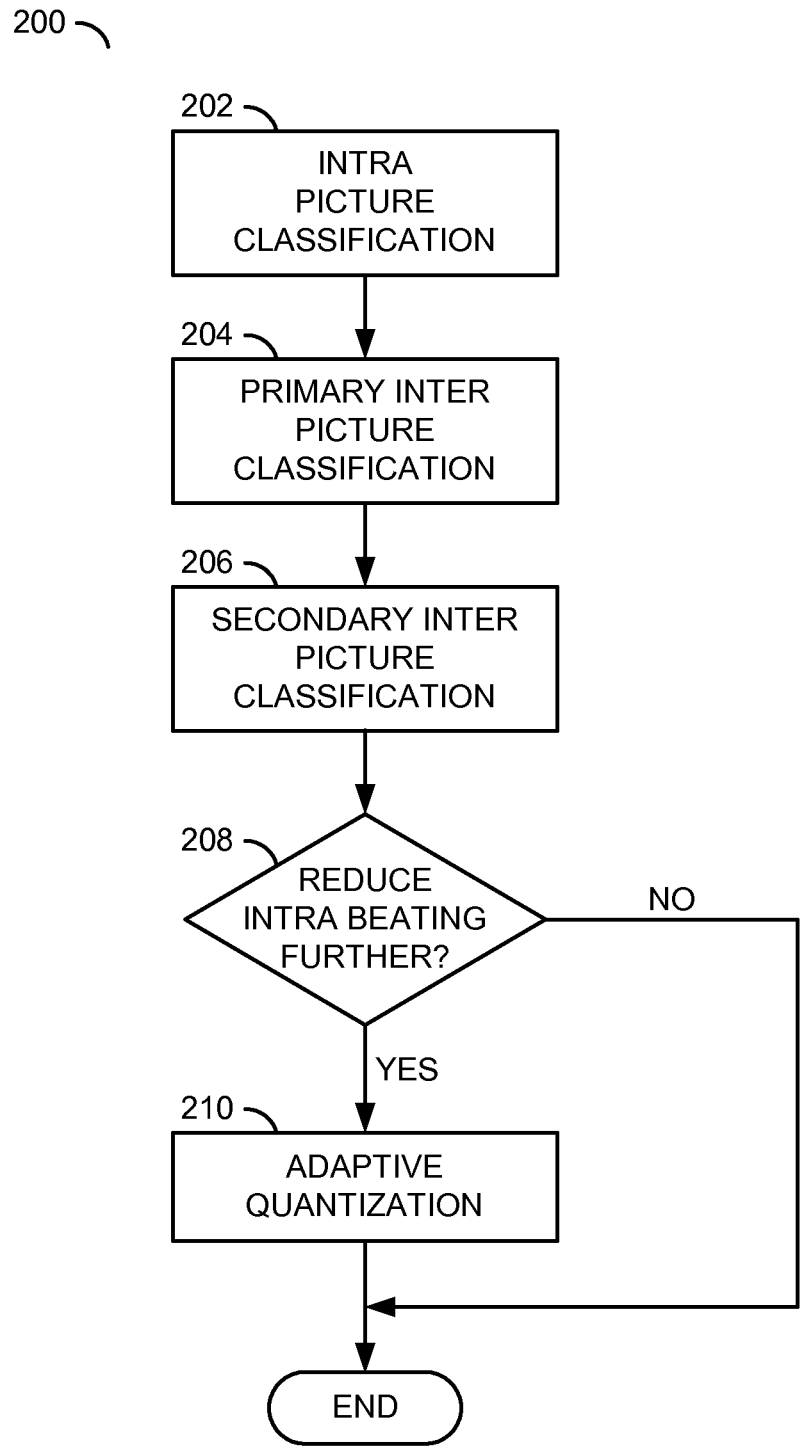
FIG. 9 is a flow diagram illustrating a compression process in accordance with a preferred embodiment of the present invention.

Referring to FIG. 9, a flow diagram is shown illustrating a process 200 for compressing a video stream in accordance with the present invention. In one example, the process 200 may comprise a state (or block) 202, a state (or block) 204, a state (or block) 206, a state (or block) 208 and a state (or block) 210. The block 202 may comprise an intra picture classification step. The block 204 may comprise a primary inter picture classification step. The block 206 may comprise a secondary inter picture classification step. The block 208 may comprise a decision state. The block 210 may comprise an adaptive quantization step.

In the block 202, at least two pictures of a video stream may be classified as intra pictures. The intra pictures generally do not use other pictures as references. In the block 204, at least two other pictures of the video stream may be classified as primary inter pictures. The primary inter pictures generally use one or more of (i) the at least two intra pictures and (ii) one or more other primary inter pictures as references. In the block 206, at least one other picture in the video stream may be classified as a secondary inter picture. The secondary inter picture generally uses the at least two primary inter pictures as references. The secondary inter picture is not used as a reference. In the block 208, a decision may be made whether to further improve intra beating reduction. When no further reduction is to be performed, the process 200 may end. When further reduction is desired, the process 200 may move to the block 210. In the block 210, intra beating reduction may be improved by adaptively quantizing one or more macroblocks of the video stream based on content of the one or more macroblocks.

In one example, the present invention generally provides a method for encoding a video stream with (A) a first intra picture and a second intra picture, where the first intra picture occurs temporally before the second intra picture, (B) a first inter picture, where the first inter picture (i) occurs temporally after the first intra picture and before the second intra picture and (ii) uses the second intra picture and one other picture occurring temporally before the first inter picture as references, (C) a second inter picture, where the second inter picture (i) occurs temporally after the first intra picture and before the second intra picture and (ii) uses the second intra picture and the first inter picture as references and (D) a third inter picture, where the third inter picture (i) occurs temporally after the first intra picture and before the second intra picture and (ii) uses the second intra picture and the second inter picture as references. Examples of first and second intra pictures and first, second and third inter pictures as recited herein are illustrated in FIGS. 4, 7 and 8 as summarized in the following TABLE 1:

TABLE 1

|  | FIG. 4 | FIG. 7 | FIG. 8 |
| --- | --- | --- | --- |
| First intra picture | I0 | I0 | L0 0 |
| Second intra picture | I15 | I15 | L0 16 |
| First inter picture | P3 | P6 | L1 4 |
| Second inter picture | P6 | P9 | L1 8 |
| Third inter picture | P9 | P12 | L1 12 |

The function performed by the flow diagram of FIG. 9 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMS, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for compressing a video stream, comprising the steps of:

(A) encoding a picture in a group of pictures (GOP) structure of said video stream as a first level one inter picture, wherein said first level one inter picture (a) occurs temporally (i) after a first intra picture of said GOP structure and (ii) before a second intra picture of said GOP structure and (b) uses only said first intra picture of said GOP structure as a single forwards reference;

(B) encoding another picture in said GOP structure of said video stream as a second level one inter picture, wherein said second level one inter picture (a) occurs temporally (i) after said first level one inter picture and (ii) before said second intra picture and (b) uses only (i) said first level one inter picture and (ii) said second intra picture as references; and (C) encoding another picture in said GOP structure of said video stream as a first level two inter picture, wherein said first level two inter picture (a) occurs temporally after said first intra picture of said GOP structure and (ii) before said first level one inter picture, (b) uses (i) said first intra picture of said GOP structure and (ii) said first level one inter picture as references, and (c) said first level two inter picture is encoded before said second level one inter picture, wherein at least one level one inter picture uses forward prediction only, one or more level one inter pictures encoded subsequently use both forward and backward prediction, and one or more uncoded pictures in said GOP structure including said first intra picture are no longer stored in memory when said second intra picture is being encoded.

2. The method according to claim 1, further comprising the step of:

adaptively quantizing one or more macroblocks of said video stream based on content of said one or more macroblocks.

3. The method according to claim 1, further comprising the step of:

encoding another picture in said GOP structure of said video stream as a second level two inter picture, wherein said second level two inter picture (a) occurs temporally (i) after said first level two inter picture and (ii) before said first level one inter picture, and (b) uses (i) said first level one inter picture as a backwards reference and (ii) said first intra picture of said GOP structure as a forwards reference.

4. The method according to claim 1, further comprising the step of:

encoding two other pictures in said GOP structure of said video stream as third and fourth level two inter pictures, wherein said third and fourth level two inter pictures use said first level one inter picture as a forwards reference and said second level one inter picture as a backwards reference.

5. The method according to claim 1, further comprising:

encoding additional pictures in said GOP structure of said video stream as either level one or level two pictures by repeating the steps B and C until all uncoded pictures in said GOP structure of said video stream between said first intra picture of said GOP structure and said second intra picture of said GOP structure are classified.

6. The method according to claim 1, wherein said first level one inter picture occurs closer in said video stream to said first intra picture of said GOP structure than to said second intra picture of said GOP structure.

7. A non-transitory computer readable storage medium containing computer executable instructions for causing a computer to execute the method according to claim 1.

8. The non-transitory computer readable storage medium according to claim 7, wherein said computer executable instructions are configured to control one or more of quantization levels, picture types, picture ordering and reference picture selection.

9. A video encoder comprising:
an encoder circuit configured to generate a compressed bit stream in response to a video stream and one or more control signals, wherein said encoder circuit (i) uses only forward prediction for at least one level one inter picture, (ii) uses both forward and backward prediction for one or more level one inter pictures encoded subsequently, and (iii) is no longer holding one or more uncoded pictures including a first intra picture of a group of pictures (GOP) structure of said video stream in memory when a second intra picture of said GOP structure is being encoded; and
a control circuit configured to generate said one or more control signals, wherein said control circuit is configured to encode said group of pictures (GOP) structure of said video stream with (A) a first level one inter picture, wherein said first level one inter picture (i) occurs temporally after a first intra picture of said GOP structure and before said second intra picture of said GOP structure and (ii) uses only said first intra picture of said GOP structure as a single forwards reference, (B) a second level one inter picture, wherein said second level one inter picture (i) occurs temporally after said first level one inter picture and before said second intra picture and (ii) uses only said first level one inter picture and said second intra picture as references, and (C) a first level two inter picture, wherein said first level two inter picture (i) occurs temporally after said first intra picture of said GOP structure and before said first level one inter picture, (ii) uses said first intra picture of said GOP structure and said first level one inter picture as references, and (iii) is inserted in said compressed bit stream before said second level one inter picture.

10. The video encoder according to claim 9, wherein said control circuit is further configured to encode said video stream by adaptively quantizing one or more macroblocks of said video stream based on content of said one or more macroblocks.

11. The video encoder according to claim 9, wherein said control circuit is further configured to encode said video stream with a second level two inter picture, wherein said second level two inter picture uses (i) said first level one inter picture as a backwards reference and (ii) said first intra picture as a forwards reference.

12. The video encoder according to claim 9, wherein said control circuit is further configured to encode pictures in said GOP structure of said video stream with third and fourth level two inter pictures, wherein said third and fourth level two inter pictures use said first intra picture of said GOP structure as a forwards reference and said second level one inter picture as a backwards reference.

13. The video encoder according to claim 12, wherein said control circuit is further configured to encode all pictures in said GOP structure of said video stream between said first intra picture and said second intra picture as one of said level one inter picture, said level two inter picture, a level three inter picture, and a fourth level inter picture.

14. The video encoder according to claim 9, further comprising a non-transitory computer readable storage medium containing computer executable instructions for controlling said control circuit.

15. The video encoder according to claim 9, wherein said one or more control signals are configured to control one or more of quantization levels, picture types, picture ordering and reference picture selection.

16. The video encoder according to claim 9, wherein said first level one inter picture occurs closer in said video stream to said first intra picture of said GOP structure than to said second intra picture of said GOP structure.

* * * * *